Sept. 30, 1930.   C. H. McCORMACK   1,777,101
REENFORCED LEAD TIPPED GASKET
Filed March 2, 1929

INVENTOR
C.H.M<sup>c</sup>Cormack.
BY
Albert Dietrich
ATTORNEY

Patented Sept. 30, 1930

1,777,101

UNITED STATES PATENT OFFICE

CLARENCE H. McCORMACK, OF BRADFORD, PENNSYLVANIA

REENFORCED LEAD-TIPPED GASKET

Application filed March 2, 1929. Serial No. 343,921.

The invention generally relates to gaskets and more particularly to that type known as lead tipped ring gaskets which are commonly employed in unthreaded pipe couplings and similar uses.

These gaskets commonly comprise a body of deformable material such as rubber, tipped with a tip ring of a metal relatively soft and having good seating qualities, such as lead, a suitable liner strip of duck or the like frequently being interposed between the rubber and the lead. The rubber portions of these gaskets have a tendency to swell and lose their shape after a short period of use and the same soft characteristic of the lead which occasions efficiency as to seating quality, occasions inefficiency because of the ease with which the lead tip ring can be deformed in use, and even in factory handling, rendering the gasket unfit for efficient service. Pipe lines are commonly laid in rough and wild country and in the course of operations the gaskets come in for very rough handling during which the deficiency of being readily deformed is accentuated and very troublesome, the gaskets sometimes being stretched to such a degree that sections must be cut out to reduce them to the proper diameter.

Therefore, it is the object of my present invention to produce a gasket embodying all of the advantages of efficient seating qualities present in the gaskets above referred to, but which is so reenforced as to protect it against deforming tendencies and strains.

To the attainment of the aforesaid objects and ends, the invention still further resides in the novel details of construction, combination and arrangement of parts, all of which will be first fully described in the following detailed description, then be particularly pointed out in the appended claim, reference being had to the accompanying drawings, in which:—

Figure 1:
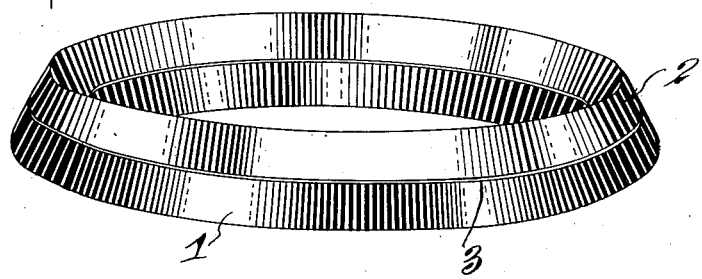
Figure 1 is a perspective view of a gasket embodying my invention.

In the drawing, in which like numerals of reference indicate like parts in all of the figures, 1 designates the main or body portion of the gasket which is formed of soft deformable material such as rubber. A lead tip 2 is fitted over the body 1 and is shaped to continue the converging sides lines thereof as indicated in the figures of the drawing. The usual interposed liner strip is indicated at 3.

The gasket, briefly described above, is of conventional form and of itself forms no part of my present invention. In the use of such gaskets, however, difficulties are occasioned by the tendencies of the rubber to become enlarged and deformed after use and also due to the readiness with which the relatively soft lead tip may be deformed by handling or rough usage.

Figure 2:
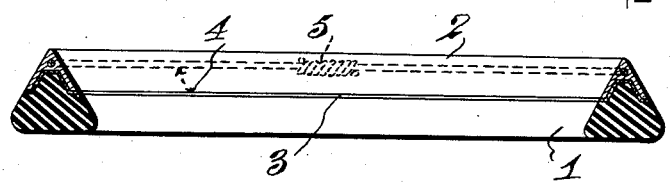
Figure 2 is a vertical cross section of the gasket shown in Figure 1.
Figure 3:
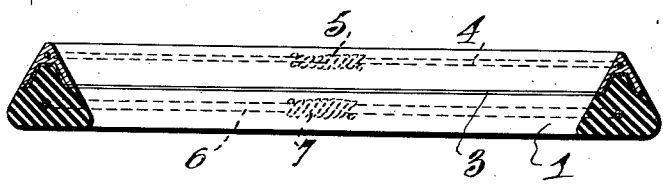
Figure 3 is a vertical cross section illustrating a modified form of the invention.

It is the purpose of my invention, therefore, to so reenforce the gasket structure as to overcome the disadvantages referred to above. To this end I imbed a harder metal ring 4 of steel or copper or the like within the lead tipped ring 2 as indicated in Figures 2 and 3 of the drawing. This ring may be continuous or bent to shape with its ends joined as indicated at 5 if desired.

In Figure 3 of the drawing I have illustrated a modification of the invention in which both the lead tipped ring 2 and the rubber body 1 are provided with reenforcing rings. In this figure a suitable reenforcing ring 6 is shown as imbedded in the gasket body 1 and, like the ring 4, the same may be formed integral or bent to shape with its ends joined as at 7.

It is to be understood that the invention is not limited to the employment of a reenforce ring which is formed of metal having circular cross section. The ring may be in the nature of a thin flat circular band or shaped otherwise in cross section if desired. It will also be obvious that the showing of the ring as bent to shape with ends joined is but one exemplary showing which comprehends the simpler and preferred form of a continuous unbroken reenforce ring.

A gasket constructed as herein disclosed will be found more durable and lasting in use since they are not subject to the ready deformation now experienced in gaskets which are not reenforced as herein disclosed.

From the foregoing description, taken in connection with the accompanying drawing, it is thought the novel details of construction, the manner of use and the advantages of my invention will be readily apparent to those skilled in the art to which it relates.

What I claim is:

A gasket comprising a ring of deformable material, a tip ring of relatively soft ductile metal fitted over a part of the ring of deformable material, and a considerably less ductile reenforce ring imbedded in the said tip ring.

CLARENCE H. McCORMACK.